(12) United States Patent
Bidewell

(10) Patent No.: US 11,763,210 B2
(45) Date of Patent: Sep. 19, 2023

(54) SUN LOUNGER COVER WITH OCCUPANCY STATUS INDICATOR

(71) Applicant: Colin Bidewell, Kelvedon (GB)

(72) Inventor: Colin Bidewell, Kelvedon (GB)

( * ) Notice: Subject to any disclaimer, the term of this patent is extended or adjusted under 35 U.S.C. 154(b) by 1096 days.

(21) Appl. No.: 16/478,739

(22) PCT Filed: Jan. 18, 2018

(86) PCT No.: PCT/GB2018/000012
§ 371 (c)(1),
(2) Date: Jul. 17, 2019

(87) PCT Pub. No.: WO2018/134557
PCT Pub. Date: Jul. 26, 2018

(65) Prior Publication Data
US 2020/0202261 A1    Jun. 25, 2020

(30) Foreign Application Priority Data

Jan. 19, 2017  (GB) ..................... 1700933
Oct. 11, 2017  (GB) ..................... 1716647

(51) Int. Cl.
| | | |
|---|---|---|
| *A47C 31/11* | (2006.01) | |
| *G06Q 10/02* | (2012.01) | |
| *A47C 7/62* | (2006.01) | |
| *G01V 9/00* | (2006.01) | |
| *A47C 7/72* | (2006.01) | |
| *G07C 1/02* | (2006.01) | |

(52) U.S. Cl.
CPC ............. *G06Q 10/02* (2013.01); *A47C 7/62* (2013.01); *A47C 7/723* (2018.08); *A47C 31/11* (2013.01); *G01V 9/00* (2013.01); *G07C 1/02* (2013.01)

(58) Field of Classification Search
CPC .......... G06Q 10/02; A47C 7/723; A47C 7/62; A47C 31/11; G01V 9/00; G07C 1/02
See application file for complete search history.

(56) References Cited

U.S. PATENT DOCUMENTS

| | | | |
|---|---|---|---|
| 9,795,322 B1 * | 10/2017 | Karunaratne ........ | A61B 5/6891 |
| 10,085,570 B2 * | 10/2018 | Bellam .................... | A47C 7/62 |
| 10,334,960 B2 * | 7/2019 | Chacon ................... | A61G 7/015 |
| 11,503,914 B2 * | 11/2022 | Bastiyali .................. | A47C 1/13 |
| 2017/0164742 A1 * | 6/2017 | Hay ........................ | G06Q 10/02 |

(Continued)

FOREIGN PATENT DOCUMENTS

| | | |
|---|---|---|
| DE | 10017821 A1 | 10/2001 |
| DE | 102014019276 A1 | 6/2016 |

(Continued)

OTHER PUBLICATIONS

International Search Report for International Patent Application No. PCT/GB2018/000012 dated Mar. 14, 2018, 3 pages.

(Continued)

*Primary Examiner* — Philip F Gabler
(74) *Attorney, Agent, or Firm* — Klintworth & Rozenblat IP LLP

(57) ABSTRACT

A sun lounger cover has a main body portion configured to in use rest substantially flat against and at least partly cover the upper surface of a sun lounger, and an occupancy status indicator configured to indicate the occupancy status of the lounger.

20 Claims, 2 Drawing Sheets

(56) References Cited

U.S. PATENT DOCUMENTS

2020/0202261 A1* 6/2020 Bidewell ................ G08B 5/221
2020/0329878 A1* 10/2020 Bastiyali .................. A47C 7/72

FOREIGN PATENT DOCUMENTS

| EP | 0141220 A1 | 5/1985 |
| WO | WO0013152 A1 | 3/2000 |
| WO | WO2015038169 A1 | 3/2015 |

OTHER PUBLICATIONS

Machine translation of DE 10017821 A1.
Machine translation of DE 102014019276 A1.
Machine translation of EP 0141220 A1.

* cited by examiner

SUN LOUNGER COVER WITH OCCUPANCY STATUS INDICATOR

FIELD

The present invention relates to a sun lounger cover with an occupancy status indicator. More particularly, the present invention relates to a sun lounger cover that indicates whether a sun lounger is occupied or available. The present invention further relates to a sun lounger cover having an occupancy tracking system. The present invention yet still further relates to a sun lounger that incorporates an occupancy tracking system.

BACKGROUND

Sun loungers, sun beds and similar furniture items are frequently used at resorts, hotels and on cruise ships by holidaymakers and tourists to relax in the sun. These types of furniture items are often used around pools or on sun decks, so that holiday makers can relax without having to sit directly on hard tiled surfaces or similar.

Usually, any given location such as the area surrounding a pool can only fit a certain number of sun loungers or sun beds, and these are consequently often in high demand, with more potential occupants than are spaces on the furniture.

A major factor affecting the enjoyment of tourists on holiday is the reserving of unattended sun loungers or similar. It is common for people to signal their informal reservation of a sun lounger or group of sun loungers by leaving items present and visible on or around the lounger or loungers, with a frequently used item being a towel. This is intended to signal on-going or imminent occupancy of the lounger, but can often be followed by extended periods of non-occupancy, with the owners of the towels indulging in other activities elsewhere for long periods of time. This can be extremely frustrating for other potential users, who may want to use the sun loungers immediately but are prevented from doing so by non-attendees who have nevertheless informally reserved the loungers by leaving these items on or around them.

Many resorts or hotels have attempted to address this issue by implementing sun lounger occupancy policies. However, these tend to rely on subjective observation by staff, and are usually only sporadically observed and enforced.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide a sun lounger cover with an occupancy status indicator which goes some way to overcoming the abovementioned disadvantages or which at least provides the public or industry with a useful choice.

It is a further object of the present invention to provide a sun lounger cover having an occupancy tracking system which goes some way to overcoming the abovementioned disadvantages or which at least provides the public or industry with a useful choice.

It is a yet still further object of the present invention to provide a sun lounger having an occupancy tracking system which goes some way to overcoming the abovementioned disadvantages or which at least provides the public or industry with a useful choice.

It is a yet still further object of the present invention to provide a sun lounger with an occupancy status indicator which goes some way to overcoming the abovementioned disadvantages or which at least provides the public or industry with a useful choice.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in a first aspect the present invention may broadly be said to consist in a sun lounger cover, comprising: a main body portion configured to in use rest substantially flat against and at least partly cover the upper surface of a sun lounger, and; an occupancy status indicator configured to indicate the occupancy status of the lounger. This allows an interested party to quickly and easily assess the occupancy status of the lounger.

In an embodiment, the occupancy status indicator comprises a display configured to display at least the states of 'occupied' and 'available'. This allows an interested party to quickly and easily assess the occupancy status of the lounger.

In an embodiment, the display is further configured to indicate an occupancy status state of 'becoming available'. This allows an interested party to quickly and easily assess the occupancy status of the lounger, and also to see if the lounger will be available at a point in the near future.

In an embodiment, the sun lounger cover further comprises at least one sensor located in the main body portion and configured to register the presence of a person or object resting on the covering. This allows the cover to assess the actual occupancy status of the lounger.

In an embodiment, the at least one sensor comprises a plurality of sensors, spaced within the main body portion so that in use at least one upper sensor will be located over the upper body part of a sun lounger and at least one lower sensor will be located over the lower body part of a sun lounger, the upper and lower sensors configured to in use register the presence of a person or object resting on the back part and lower body part of the sun lounger respectively. This allows the cover to assess the actual occupancy status of the lounger.

In an embodiment, the sun lounger cover further comprises a CPU, the CPU configured to receive signals from the at least one sensor and to alter the occupancy status displayed on the occupancy status indicator between occupancy status states. This allows the cover to assess the actual occupancy status of the lounger, and to change the occupancy status accordingly.

In an embodiment, the occupancy status indicator forms part of a display and power unit, the display and power unit further comprising a battery configured to provide power to the sun lounger cover. This allows the CPU, sensors and other necessary elements to run.

In an embodiment, the display and power unit further comprises a solar panel configured to provide solar power to the battery. This allows the cover to be power-independent.

In an embodiment, the occupancy status indicator further comprises a plurality of timer units, a first one of the timer units configured to display the current local time, the CPU further configured to control a second timer unit to display current time when the signals received from the at least one pressure sensor indicate that an object or person is resting on the sun lounger cover, and to freeze or stop the second timer unit when the weight is removed. This allows the time periods of occupancy and non-occupancy to be displayed.

In an embodiment, the sun lounger cover further comprises a third timer unit, the CPU further configured to control the third timer unit to display either the length of time after which an unoccupied lounger is deemed to be vacant, or the time of a future booking. This allows the times of occupancy, bookings, etc to be displayed.

In an embodiment, the sun lounger cover further comprises a fourth timer unit, the CPU further configured to control the fourth timer unit to display the difference between the first and second timers, and to reset the second timer to display the current time if, after the second timer unit has been stopped, the CPU receives a signal from the sensor or sensors indicating that an object or person is again resting on the sun lounger cover within a pre-set time period. This allows a user to know how long the lounger has been unoccupied for, and to assess if it may become available shortly.

In an embodiment, the CPU is configured to change the occupancy status indicator to indicate that the lounger is available if no signal indicative of an object or person resting on the sun lounger cover is received within a pre-set time period. This allows an interested party to know when the lounger is unoccupied.

In an embodiment, the sun lounger cover further comprises a transmitter/receiver configured for communication with the CPU, and further configured to receive and transmit signals to a remote receiver, the CPU connected to the receiver to receive signals indicative of bookings, the CPU further configured alter the occupancy status indicator accordingly. This allows users to check availability and make bookings.

In an embodiment, the main body comprises an inner cushioning material and a flexible outer fabric covering. These types of materials are inexpensive, easy to source and form, and provide comfort for a user.

In a second aspect, the invention may broadly be said to consist in a lounger, comprising a cover as outlined in any one of the preceding statements.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which.

DETAILED DESCRIPTION

Figure 1:
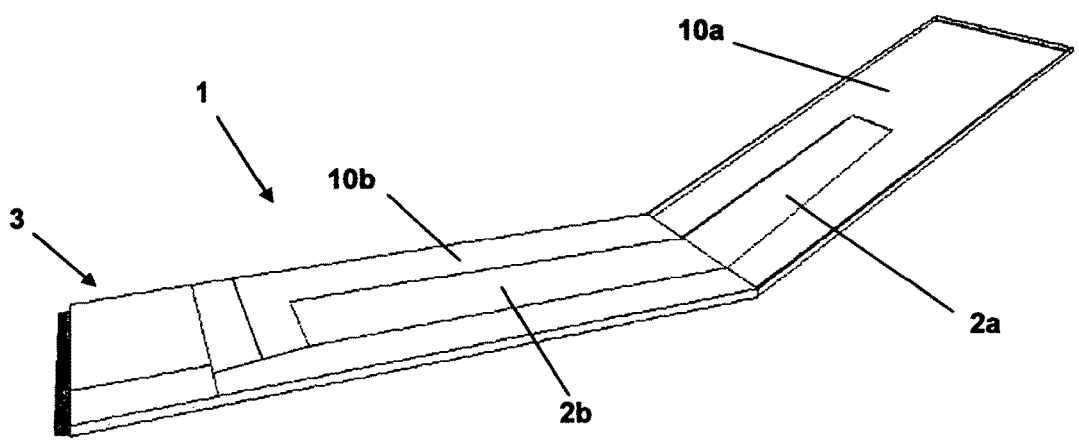
FIG. 1 shows a schematic perspective view from one side and above of a sun lounger cover according to an embodiment of the present invention, the sun lounger cover having an upper body part and a lower body part, the cover having sensors integral with the upper and lower body parts, and a display and power unit at the foot or end of the lower body part, the display portion of the display and power unit providing a visual indication of the occupancy status of the lounger via a coloured 'traffic light' display, the display and power unit incorporating a solar panel to power the unit, the display and power unit also having an integral wireless communication system to allow the cover to communicate with a remote server or terminal.
Figure 2:
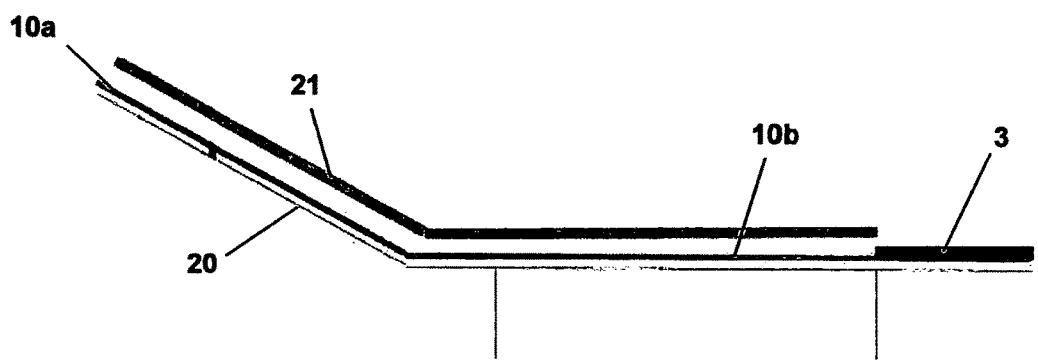
FIG. 2 shows a schematic side view of the sun lounger cover of FIG. 1 fitted to a sun lounger, with a users towel covering the sun lounger cover.
Figure 3:
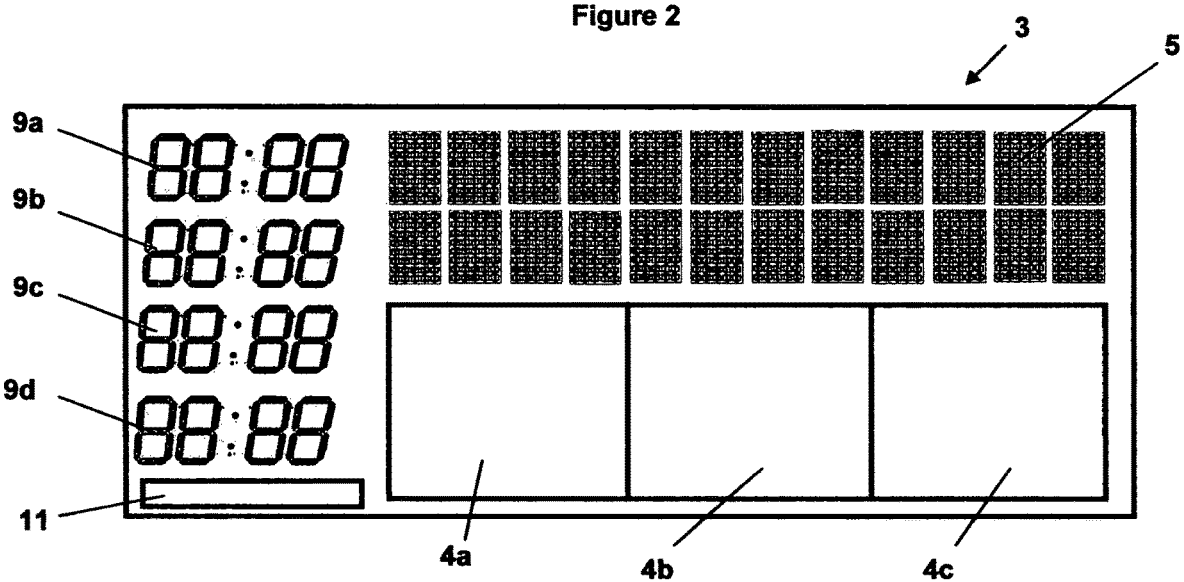
FIG. 3 shows a view from above of the display and power unit of the embodiment of the sun lounger cover shown in FIGS. 1 and 2.
Figure 4:
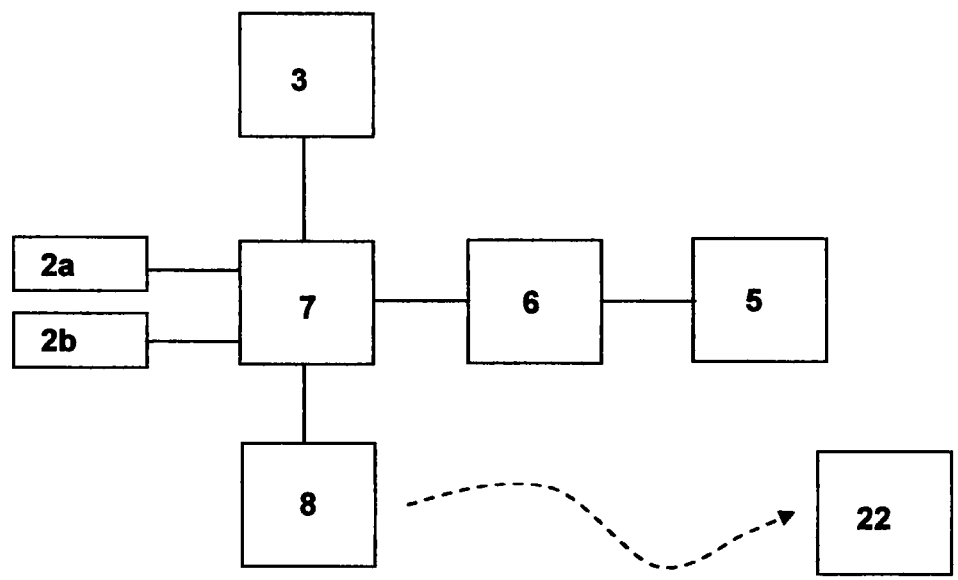
FIG. 4 shows a schematic view of the connections between a CPU within the display and power unit, the display, the integral wireless communication system, the solar panel and an associated battery, and the sensors.

Embodiments of the invention, and variations thereof, will now be described in detail with reference to the figures.
Lounger Cover An embodiment of the sun lounger cover 1 is shown in FIGS. 1 and 2. The sun lounger cover 1 is shown as it would be for use, deployed or laid flat on the top or upper surface of a sun lounger. In FIG. 2, the cover 1 is shown on a lounger 20, covered by a towel 21.

The cover 1 has a main body portion 10 that is formed from an inner cushioning material such as polyurethane foam, with a flexible outer fabric covering formed from a water resistant material. 'Water-resistant' in this context is intended to indicate that the covering is water-resistant, sand-resistant and sun-lotion resistant, so that the sensors (see below) and the power-generating qualities of the solar cell (also see below) are not adversely affected during operation, should the cover 1 and/or the cells get splashed by water, or covered by the lotion or another substance. The cover 1 is configured to in use rest substantially flat against and substantially cover the upper surface of a sun lounger, so that the legs, back and head of a person reclining on the lounger will not contact the lounger directly. The main body 10 of the cover 1 has an upper body part 10a and a lower body part 10b, that are intended to substantially correspond to the upper and lower parts of a sun lounger on which an occupant will rest the upper and lower parts or halves of their body respectively.

Sensors 2 are integrated into the upper and lower parts 10a, 10b: a sensor 2a in the upper part 10a, and a sensor 2b in the lower part 10b. The sensors are configured so that they will register a person or object resting on the covering. That is, a person lying on the sun lounger will trigger the sensors.

The sensors 2 can be pressure pads that register the weight of a user lying or sifting on the lounger, capacitive touch sensors, beam break sensors, push button type sensors, or a combination of these sensor types. Other suitable types of sensor could also be used instead of or in combination with these. It should be noted that 'sensor' as used in this specification can refer to a single sensor, or a group or cluster of sensors—e.g. 'sensor' 2a could be a single sensor, or a group of single sensors distributed through the upper part 10a.

A display and power unit 3 is located at the foot or lower end of the cover 1, in this embodiment as an extension of/to the lower part 10b, although this could in variations be a separate item to the body 10. The display and power unit 3 has three main functions: firstly, to display the occupancy status to any interested party in the vicinity; secondly, to provide power to the cover 1 and; thirdly, to transmit data to a remote source.

The occupancy status is displayed visually via a visual display unit 4 on the upper surface of the display and power unit 3. The visual display unit 4 has lights or displays that can show three different colour statuses. In variations, the display can be configured to show occupancy in a manner other than colours, for example for users that are visually impaired, or where bright sunlight might make it difficult to see an illuminated display. However, in this embodiment, when the display is red (4a), this indicates that the lounger is 'occupied'. When the display is yellow (4b), this indicates that the occupancy status state is one of 'imminent availability', or that there is a future booking. That is, that a booking may be coming to an end, or that the current occupant has occupied the lounger to nearly the limit of the time allowed by local rules or guidelines; or the period of vacancy of the lounger is nearing the policy time in force, that being the maximum time of un-attendance allowed before the lounger is deemed vacant for the next occupancy. The proportion of policy time elapsed at which the occupancy status indicator changes from "occupied"/red to "free soon"/yellow is determined by the resort operator and is programmed into the CPU 3.

When the display is green (4c), this indicates that the lounger is 'available', either for immediate occupation, or for booking for immediate or future occupation (although any future booking will be subject to the booking constraints configured in the system—for example bookings cannot be made more than 24 hours in advance, with only one future booking per person per lounger allowed at any one time.)

In this embodiment, the display portions 4a, 4b, 4c are also configured to show text indicative of the status of the lounger. The red portion 4a contains the text 'occupied', the yellow portion 4b is configured to show the text 'becoming available', 'booked', or 'free soon', or similar, and the green portion 4c shows the text 'available'.

The display and power unit 3 will also show a unique identifier 11 for the lounger, such as a number, or a number in combination with a location identifier, such as for example 'Deck C-Unit 07'.

Power is provided via a solar panel and battery combination 5, 6. The battery 6 in this embodiment is built into the body of the display and power unit 3, with the solar panel 5 on, or forming part of, the upper surface. The solar panel 5 is connected to the battery 6 to provide power to the display and power unit 3, and to the sensors 2a, 2b as necessary.

A CPU 7 is also built into the display and power unit 3. The CPU 7 is configured to receive signals from the sensors 2a, 2b and to control the display.

A wireless transmitter/receiver 8 is also built into the display and power unit 3, and is connected to the CPU so that the CPU can receive and transmit signals and commands from a remote source (and to act on these as appropriate—for example if a remote signal indicating that the unit has been booked is received, the CPU will change the display from green to red).

Four clocks or timer units 9 are also included as part of the display.

In use, with the lounger occupied by a user, the first and second timer units 9a, 9b display the current local time. When a user vacates the lounger, the CPU 7 will receive a signal from the sensors 2a, 2b that indicates a status change—i.e. that they are no longer registering the presence of a user on the lounger. The CPU 7 controls the second clock 9b to freeze or stop at the current time (the time at which the lounger is vacated), whilst clock 9a continues to measure current time.

The third timer unit or clock 9c displays the (static) length of time after which an unoccupied lounger is deemed to be vacant, or displays the time of a future booking, if one has been made. This (the length of time after which an unoccupied lounger is deemed to be vacant) is dependent on local policy, and although this is a set or fixed period of time, it may change depending on the time of day, or the season, or other factors as determined by the resort or ship operator. For example, the non-occupancy time period may be extremely short during the afternoon peak hours, but extended in the evening.

The fourth clock 9d displays the difference between the time displays of clock 9a and 9b. If a user, having vacated the lounger, then returns to the same lounger before the duration as measured by clock 9d equals the policy time displayed on clock 9c, then clock 9b is reset to the current time as displayed in clock 9a and the occupancy status continues as occupied/booked. If however the user returns to the lounger when the duration of vacancy as measured by dock 9d exceeds the policy time displayed in clock 9c, then the status is confirmed as available/free. The dock 9b continues to record frozen time and the dock at 9d continues to measure the difference between clocks 9a and 9b. Now, the value on clock 9d will have exceeded the policy time stated on dock 9c until the lounger is either booked for occupancy via the web/app interface or by a new user occupying the lounger from a walk-up position As outlined above, when the display 4a is lit up red, this indicates that the lounger is 'occupied' or 'booked'. When the display 4b is illuminated yellow, this indicates that the occupancy status state is one of 'imminent availability' or booked for a future time. That is, that a booking may be coming to an end in the case of the former, or that the current occupant has occupied the lounger to nearly the limit of the time allowed by local rules or guidelines or that the lounger has been booked for a future time. When the time on the fourth clock 9d exceeds the time on the third dock 9c, the display 4c illuminates green, indicating that the lounger is 'available', either for immediate occupation, or for booking for immediate occupation.

The cover 1 as described above is 'networked' via the transmitter/receiver 8. Bookings and occupancy can be controlled via a centralised server 22, with which a user can communicate via an app or similar in order to make bookings for sun loungers.

In a variation of the cover 1 described above, the cover could be used 'stand alone', without a transmitter/receiver, or with a transmitter/receiver that is only capable of localised communication—e.g. directly with a single terminal such as an app-enabled phone or similar. The cover would be pre-programmed with data such as occupancy lengths, and would sense the presence of a user and calculate the occupancy status accordingly.

It should be noted that some or all of the functionality described above can be temporarily disabled or deactivated as required, via the CPU 7. The CPU 7 receives commands from the remote source or centralised server 22, via the wireless transmitter/receiver 8, and disables functionality in the cover 1 as instructed.

For example, the various ways described above of measuring and managing occupancy such as the allocation of blocks of time, or comparing lounger vacancy durations to occupancy policies.

Further, the ability of a user to manually check-out and/or extend their session (as outlined in detail below) can be disabled if required. This may be desirable in order to prevent abuse of the system, for example by another person pushing the button of an absent bather's lounger to extend their session on their behalf and in their absence. Disabling the manual check-out button may be desirable in order to prevent unauthorised checking out by users who did not make the booking or who are not in occupation of the lounger.

Further functionality can be used as required/desired, and as allowed by hardware or software restrictions. For example, if the mobile device which a user is using for bookings or similar has built-in GPS functionality, this can be used to help direct them to a booked lounger (which will be located at known GPS co-ordinates).

Examples of Use

Examples of the cover 1 in use are as outlined below:

At 4.00 AM (when there is no user activity), all timers reset, so that the loungers are all in a 'blank slate' condition.

In the examples below, there is no maximum continuous occupancy slot—occupancy can be continuous, until either thirty minutes of non-occupancy has elapsed, or the occupant manually checks out. That is, the maximum continuous period for non-occupancy (a user occupies the lounger, then leaves to go for a swim, get a drink, or similar) is 30 minutes. The actual periods can vary, depending on local policies (e.g. 20 minutes, one hour, two hours, etc, as allowed/applicable depending on local guidelines or rules), and should not be taken as an absolute.

First Example

At just after 9.00—e.g. 09.03 AM—the first user of the day ('first user') locates one of the loungers—a free or unoccupied lounger, and occupies the lounger at this time. The lounger is fitted with a cover 1 as described above. The sensors 2 sense the presence of a user as they occupy the lounger (i.e. as the first user occupies the lounger), and this is signalled to the CPU, which registers the occupancy status to 'occupied'. The user can also optionally check in via an app on their phone or similar. The visual display unit 4 changes from the previous indication of 'free'/green, to 'occupied'/red. The CPU 7 sends a message via the transmitter/receiver 8 to the central server 22 indicating that the unit is occupied. For all the time that the user is physically occupying the lounger, clocks 9a and 9b will be in sync, or showing the same/identical time. Clock 9c will show the static time of total allowable non-occupancy for the same user (e.g. 30 minutes in this example, as outlined above), and clock 9d will show a time of zero at the start of the occupancy.

After a short period of time, at for example 09.10 AM, the first user vacates the lounger in order to go for a swim, have a drink at the bar, or similar. They leave their towel or similar, to signal that they intend to return. When the first user gets up, the sensors register that they are no longer registering the presence of a user, and this is signalled to the CPU. The CPU will freeze clock 9b at the then current time—09.10 AM. As outlined above, the length of non-attendance—i.e. the length of time which a user is entitled to be not physically registered by the sensors and therefore the lounger in turn, before the lounger is deemed to have been vacated in favour of the next occupant—is a set time period of 30 minutes.

During this period of non-occupancy, the clock 9a continues to show the current time. Clock 9b remains frozen on the time at which the user vacated the lounger (09.10 AM in this example). Clock 9c continues to show the fixed time period of allowable vacancy, and clock 9d counts upwards from zero. In this example, dock 9d counts upwards in five-minute increments, with the CPU checking for re-occupancy every five minutes.

At 09.36 AM the first user will have been non-occupant for 26 minutes (since 09.10 AM). That is, for 85% of the allowable policy time (30 minutes). If the first user checked in via their app, then an alert will be sent, informing them of the imminent expiry of their occupancy. The occupancy status indicator (on the lounger as well as on the associated app if these are paired or connected) changes from Red to Yellow.

At 09.38 AM, the first user returns to the lounger, and spends a couple of minutes occupying the lounger, before vacating at 09.40 AM. Once they re-occupy the lounger, clock 9b resets to the time showing on Clock 9a. Clock 9d will go to zero as it measures the difference between clocks 9a and 9b, which are showing the same time, as the user has returned to the lounger within the 30-minute grace period configured in this instance. The occupancy status indicator (on the lounger as well as on the app if so paired) will revert back to red.

At 09.40 AM, the first user vacates the lounger, taking their towel with them (that is, they do not intend to return). A second user immediately or almost immediately occupies the lounger—that is, without waiting for it to revert to 'available'. The second user is able to legitimately occupy the lounger, but is unable to book or check into the lounger, as at this point, the CPU has 'continued' the previous occupancy. However, the second user's occupancy cannot be over-ridden by another user's booking, as the CPU is marking the lounger's status as non-vacant. Clocks 9a and 9b show the current time, clock 9c continues to show the 30-minute non-occupancy period, and clock 9d shows a time of zero.

It can be seen that if a user returns within the period before the lounger is considered to have been non-occupied for long enough to be not in use, then their occupancy continues. However, if they do not return within the specified time (in this example 30 minutes), then the visual display unit 4 will change from red (occupied) to green at the end of the 30-minute period, to show that the lounger is available. If the user returns within the 30-minute period, then the occupancy time will recommence from the current time, taking into account the total elapsed time also. When the lounger is becoming available, the visual display unit 4 reverts from red, through to yellow in the last ten minutes, and then to green.

Second Example

A second example is as follows: at 10.40 AM, a second user books the lounger for 12.00. At 10.43 a fourth user occupies the currently free lounger which has been booked by the second user from 12.00. The fourth user accepts that they will need to vacate at or before this time. The visual display unit 4 shows yellow/amber at the time of their occupancy. Clocks 9a and 9b show the current time (10.30 AM). Clock 9c shows the 12.00 booking time, and clock 9d shows a time of 00.00.

At 10.50, the fourth user vacates the lounger. Clock 9a will continue to show the current time, clock 9b will show the time at which the lounger was vacated (10.50 AM), clock 9c will continue to show the booking time of 12.00, and clock 9d will count upwards in five-minute increments from 10.50.

At 12.00, there are two possibilities: the second user occupies the lounger, or they do not appear.

If the second user occupies the lounger as booked at 12.00, then their booking confirmation reconciles with the lounger ID. Their occupancy will continue as normal (30-minute maximum periods of non-occupancy). The visual display unit 4 will change to red, to show that the lounger is occupied.

If the second user does not occupy the lounger, then a thirty-minute grace period commences at noon, the start time of their booking slot. Clocks 9a and 9b continue to show the current time, clock 9c shows a thirty-minute static time, and clock 9d shows a thirty-minute count-up from zero. The visual display unit 4 remains yellow during this thirty-minute period.

At 12.30, when the second user does not appear, the grace period expires, and the lounger status becomes 'free', or 'available'. The visual display unit 4 changes to green.

Alternatively, if the second user occupies the lounger for (for example) half-an-hour, and then changes their mind and decides to do something else, they can cancel their booked slot either via a button on the display and power unit 3, or via their app. This over-rides the time needed to elapse for the lounger to become free, and immediately changes the occupancy status to 'available', with the visual display unit changing to green to reflect this.

Third Example

A fifth user then occupies the (now available) lounger at 2.00 PM, sitting (rather then lying) to read a book and as a consequence only triggering the lower one of the sensors—sensor 2b. They manually override the dual-sensor requirement either via their app, or via a button on the display and power unit 3. At intervals, they will receive prompts, and can continue to manually override these. The status of the lounger will be shown as 'occupied' during this period, with the visual display unit displaying red. Both clocks 9a and 9b show the current time during the occupancy, clock 9c shows a thirty-minute period, and clock 9d commences a count-up from zero, until manually re-set by the user.

The fifth user vacates the lounger at 3.00 PM, at which point clock 9b freezes and remains as showing 3.00 PM, clock 9a continuing to show the current time, and clock 9d counting up from zero. The visual display unit continues to show red/booked during this time.

At 3.26 PM, when 85% of the 30-minute period of non-occupancy has elapsed, a notification is sent to the fifth user via the app (in all of these embodiments, the system is configured so that alerts will be sent to users via the app on their phones at the point where 85% of the 30-minute period of non-occupancy has elapsed). The visual display unit changes to display yellow, indicating that the lounger is becoming available.

At 3.30 PM, the lounger becomes available, and the visual display unit changes to display green, indicating that the lounger is available.

Fourth Example

A sixth user books the lounger for a slot from 4.00 PM to 6.00 PM, using the app on their phone. Up until that time, the visual display unit displays yellow, indicating that the lounger is booked, with clock 9c showing the booking time of 4.00 PM.

At 4.00 PM, the user has not arrived. Clock 9a shows the current time, dock 9b shows the time of the booking, clock 9c shows the total length of the booked time slot, and clock 9d starts a count-up from 4.00 PM, showing the time elapsed.

At 6.10 PM the sixth user occupies the lounger, this ten-minute period being within the grace period of the booking. All the clocks revert to reflect a legitimate occupancy, as in the examples above.

If the sixth user had not occupied the lounger, then after thirty minutes, the status would have reverted to 'available'/ green, as outlined in the examples above.

In the embodiment and examples described above, bookings can be made a maximum of twenty-four hours ahead of the current time. A user can book a lounger for the following morning, for example, but cannot book any further ahead than twenty-four hours. A user also cannot block-book loungers. One member of a family or group can book multiple loungers, but the server can be programmed with appropriate rules to ensure that these are within reasonable parameters—for example, no more than four loungers at one time, and only simultaneous bookings of co-located loungers, for example.

In the example above, and in other scenarios where a user can check in via their app (e.g. in the first example it is noted that the user can (optionally) check in via their app), a check-in request is sent from the app to the lounger (the app is loaded on a mobile device, which communicates via the local wireless or mobile network with either the remote source/centralised server 22, which then communicates with the CPU 7 via the transmitter/receiver 8, or alternatively the app/mobile device communicates with the CPU 7 directly, via the transmitter/receiver 8.) A challenge code is displayed on each individual lounger. A user is prompted to enter this challenge code into their app to complete the pairing between their app and a particular lounger—to link a specific device (user) and lounger to legitimise bookings, etc. It should be noted that the challenge code can be written or printed onto the lounger, or it could be displayed on a screen on the lounger and updated at intervals (e.g. every 24 hours) when an 'update' signal is received from the remote source/CPU.

If the covers 1 or loungers the include the cover 1 are not connected to a network, or if there is no network connectivity, a proximity tool can be used to ensure that the covers 1 are synchronised and ready for use. The proximity tool comprises a hand-held device that includes it's own dock, which has been validated as true and correct in measuring the current time. In use, an operator visits each lounger as part of the system's overall maintenance/calibration regime, and holds the proximity tool against or in close proximity to each lounger unit, which then calibrates/synchronises the internal docks as necessary. For example, clock 9a—the clock measuring current time—will synchronise to the time of the proximity tool. If clock 9a has fallen out of synchronisation this wouldn't otherwise have been detected, and cannot be corrected by a central server as there is no connection. This functionality is extended to the other clocks if any of them have fallen out of logic for any reason, and a reset is required. Connection can also be made via a physical connection such as a lead and socket, or similar.

It should be noted that in the preferred embodiment, the sensors 2 are of the type that will register all reasonable weight placed on the upper and lower parts 10a, 10b.

However, there will be a cut-off weight (for example 5 Kg) programmed into the CPU and if the weight is above this, then this will register as a person occupying the lounger. This ensures that items such as damp towels or similar cannot 'fool' the sensors by being left on the lounger when a person is not present.

Figure 5:
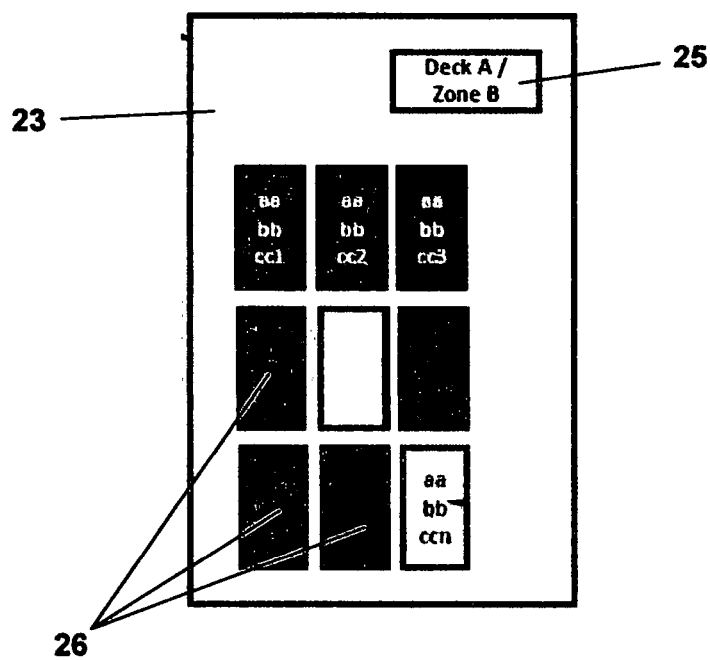
FIG. 5 shows a schematic view of the screen of an associated app that can be used to view and locate booked or occupied loungers, and to book a lounger as required.

As outlined above, an app or similar can be used to make bookings, the app communicating with a central server, which allocates individual bookings. As shown in FIG. 5, the app can also be used to assess which loungers in a local or wider area are free, booked, or imminently available. For example, in the example of FIG. 5, the screen 23 of the mobile device on which the app is loaded is shown. A user has navigated to a specific location which is shown by identifier 25 in the top-right hand corner of the screen. There are nine loungers in this location, shown by the icons 26, the identifier and status of each of these being shown on the screen via a 'traffic light system' (red—occupied, yellow—imminently available, and green—free or unoccupied). A user can assess the status availability of these loungers via the app, noting which ones are occupied, which are free, and which ones will be available shortly, and can choose a lounger in order to make a booking.

The cover 1 as described above is a separate item to the lounger itself. It should be noted that in variations, the cover 1 could be integral with, or built into, the lounger, or at least partially integral to the lounger (e.g. the display and power unit 3 could be integral with the lounger, with the cushion portion of the cover (including the sensors) formed as a removable portion that can be deployed on the lounger base and plugged into the display and power unit 3 as required. The sensors 2 could also be wireless units, communicating with the display and power unit 3 without the need for wires or plugging in.

It should further be noted that in the examples described above, the booking status is shown via the visual display unit. A chime or similar can also be used for notification of certain events to a user, such as for example the reaching of change time from 'occupied' to 'becoming free' status.

It should further be noted that the booking system described above could be used in other environments, such as for example gyms, or other environments where it is useful to measure and manage occupancy or equipment usage (e.g. businesses such as call centres, or businesses with remote working practices and building occupancy levels.)

The invention claimed is:

1. A sun lounger cover, comprising:
   a main body portion configured to in use rest substantially flat against and at least partly cover the upper surface of a sun lounger;
   at least one sensor located in the main body portion and configured to register the presence of a person or object resting on the covering;
   an occupancy status indicator configured to indicate the occupancy status of the lounger;
   a CPU, the CPU configured to receive signals from the at least one sensor and to alter the occupancy status displayed on the occupancy status indicator between occupancy status states;
   the occupancy status indicator further comprising a plurality of timer units, a first one of the timer units configured to display the current local time, the CPU further configured to control a second timer unit to display current time when the signals received from the at least one pressure sensor indicate that an object or person is resting on the sun lounger cover, and to freeze or stop the second timer unit when the weight is removed.

2. A sun lounger cover as claimed in claim 1 wherein the occupancy status indicator comprises a display configured to display at least the states of 'occupied' and 'available'.

3. A sun lounger cover as claimed in claim 2 wherein the display is further configured to indicate an occupancy status state of 'becoming available'.

4. A sun lounger cover as claimed in claim 1 wherein the at least one sensor comprises a plurality of sensors, spaced within the main body portion so that in use at least one upper sensor will be located over the upper body part of a sun lounger and at least one lower sensor will be located over the lower body part of a sun lounger, the upper and lower sensors configured to in use register the presence of a person or object resting on the back part and lower body part of the sun lounger respectively.

5. A sun lounger cover as claimed in claim 4 wherein the occupancy status indicator forms part of a display and power unit, the display and power unit further comprising a battery configured to provide power to the sun lounger cover.

6. A sun lounger cover as claimed in claim 4 further comprising a third timer unit, the CPU further configured to control the third timer unit to display either the length of time after which an unoccupied lounger is deemed to be vacant, or the time of a future booking.

7. A sun lounger cover as claimed in claim 6 further comprising a fourth timer unit, the CPU further configured to control the fourth timer unit to display the difference between the first and second timers, and to reset the second timer to display the current time if, after the second timer unit has been stopped, the CPU receives a signal from the sensor or sensors indicating that an object or person is again resting on the sun lounger cover within a pre-set time period.

8. A sun lounger cover as claimed in claim 4 further comprising a transmitter/receiver configured for communication with the CPU, and further configured to receive and transmit signals to a remote receiver, the CPU connected to the receiver to receive signals indicative of bookings, the CPU further configured alter the occupancy status indicator accordingly.

9. A sun lounger cover as claimed in claim 1 wherein the occupancy status indicator forms part of a display and power unit, the display and power unit further comprising a battery configured to provide power to the sun lounger cover.

10. A sun lounger cover as claimed in claim 9 wherein the display and power unit further comprises a solar panel configured to provide solar power to the battery.

11. A sun lounger cover as claimed in claim 9 further comprising a third timer unit, the CPU further configured to control the third timer unit to display either the length of time after which an unoccupied lounger is deemed to be vacant, or the time of a future booking.

12. A sun lounger cover as claimed in claim 11 further comprising a fourth timer unit, the CPU further configured to control the fourth timer unit to display the difference between the first and second timers, and to reset the second timer to display the current time if, after the second timer unit has been stopped, the CPU receives a signal from the sensor or sensors indicating that an object or person is again resting on the sun lounger cover within a pre-set time period.

13. A sun lounger cover as claimed in claim 9 further comprising a transmitter/receiver configured for communication with the CPU, and further configured to receive and transmit signals to a remote receiver, the CPU connected to the receiver to receive signals indicative of bookings, the CPU further configured alter the occupancy status indicator accordingly.

14. A sun lounger cover as claimed in claim 1 further comprising a third timer unit, the CPU further configured to control the third timer unit to display either the length of time after which an unoccupied lounger is deemed to be vacant, or the time of a future booking.

15. A sun lounger cover as claimed in claim 14 further comprising a fourth timer unit, the CPU further configured to control the fourth timer unit to display the difference between the first and second timers, and to reset the second timer to display the current time if, after the second timer unit has been stopped, the CPU receives a signal from the sensor or sensors indicating that an object or person is again resting on the sun lounger cover within a pre-set time period.

16. A sun lounger cover as claimed in claim 15 wherein the CPU is configured to change the occupancy status indicator to indicate that the lounger is available if no signal indicative of an object or person resting on the sun lounger cover is received within a pre-set time period.

17. A sun lounger cover as claimed in claim 14 further comprising a transmitter/receiver configured for communication with the CPU, and further configured to receive and transmit signals to a remote receiver, the CPU connected to the receiver to receive signals indicative of bookings, the CPU further configured alter the occupancy status indicator accordingly.

18. A sun lounger cover as claimed in claim 1 further comprising a transmitter/receiver configured for communication with the CPU, and further configured to receive and transmit signals to a remote receiver, the CPU connected to the receiver to receive signals indicative of bookings, the CPU further configured alter the occupancy status indicator accordingly.

19. A sun lounger cover as claimed in claim 1 wherein the main body comprises an inner cushioning material and a flexible outer fabric covering.

20. A lounger including a sun lounger cover as claimed in claim 1.

* * * * *